United States Patent [19]

Fraser et al.

[11] Patent Number: 5,430,486
[45] Date of Patent: Jul. 4, 1995

[54] HIGH RESOLUTION VIDEO IMAGE TRANSMISSION AND STORAGE

[75] Inventors: Peter W. Fraser, Oakland; Robert P. Marcus, Lafayette, both of Calif.

[73] Assignee: RGB Technology, Alameda, Calif.

[21] Appl. No.: 107,988

[22] Filed: Aug. 17, 1993

[51] Int. Cl.⁶ .............................................. H04N 7/12
[52] U.S. Cl. .................................. 348/426; 348/435; 358/310
[58] Field of Search ............... 348/426, 429, 432, 434, 348/435; 358/310, 335; H04N 7/12

[56] References Cited

U.S. PATENT DOCUMENTS

| | | | |
|---|---|---|---|
| 3,752,911 | 8/1973 | Morchand et al. | 348/426 |
| 3,803,352 | 4/1974 | Goldberger | 178/6.6 A |
| 4,660,096 | 4/1987 | Arlan et al. | 358/310 |
| 4,660,096 | 4/1987 | Arlan et al. | 358/310 |
| 4,939,586 | 7/1990 | Nabati et al. | 358/335 X |
| 4,991,010 | 2/1991 | Hailey et al. | 358/140 |
| 5,241,382 | 8/1993 | Paik et al. | 348/426 |

Primary Examiner—Victor R. Kostak
Attorney, Agent, or Firm—Crosby, Heafey, Roach & May

[57] ABSTRACT

A new device and method allows simple transformation of a high resolution video image, still or full motion, into a number of segments, each of which can be converted to a standard NTSC or PAL television frame. Each frame can be encoded with information such as segment location and possibly time or other information and then stored or transmitted as a standard television signal. The original high resolution video image can be reconstructed by selecting each television frame and using the encoded information to reassemble the segments. The reconstructed image has full original resolution but, depending on the image, may not be able to reproduce motion at full speed.

10 Claims, 6 Drawing Sheets

HIGH RESOLUTION VIDEO IMAGE TRANSMISSION AND STORAGE

FIELD OF THE INVENTION

This invention pertains to the field of transmitting and storing high resolution video images using standard resolution equipment.

BACKGROUND OF THE INVENTION

Although equipment which is capable of recording or transmitting regular, relatively low resolution video standard signals (PAL or NTSC for example) is common and inexpensive, equipment capable of recording or transmitting the higher resolution images typically associated with computer workstations is not readily available or is prohibitively expensive.

Others have sought to store or transmit high resolution pictures as a series of lower resolution pictures, with varying degrees of success. Goldberger, U.S. Pat. No. 3,803,352, discloses converting a high resolution video image for storage on low-resolution magnetic tape but is limited to handling only still images that are an integral multiple of the number of lines in the storage medium. Goldberger cannot handle lines that have more horizontal detail than NTSC and Goldberger makes no provision for dividing lines into horizontally adjacent segments. Arlan et al., U.S. Pat. No. 4,660,096, disclose storing portions of a high resolution video image in low resolution for storage on conventional media. This system also is limited to still images only and can only provide integral reductions. Hailey et at., U.S. Pat. No. 4,991,010, disclose an interpolation filter for simply reducing the resolution of a complete high resolution image to a lower resolution.

SUMMARY OF THE INVENTION

The new device allows simple transformation of a high resolution video image into a number of segments, each of which can be converted to a standard format television frame, such as NTSC, PAL, S-video, SECAM or others. Each frame can be encoded with information such as segment location and possibly time or other information and then stored or transmitted as a standard television signal. The original high resolution video image can be reconstructed by selecting each television frame and using the encoded information to reassemble the segments.

DESCRIPTION OF THE PREFERRED EMBODIMENTS

Figure 1:
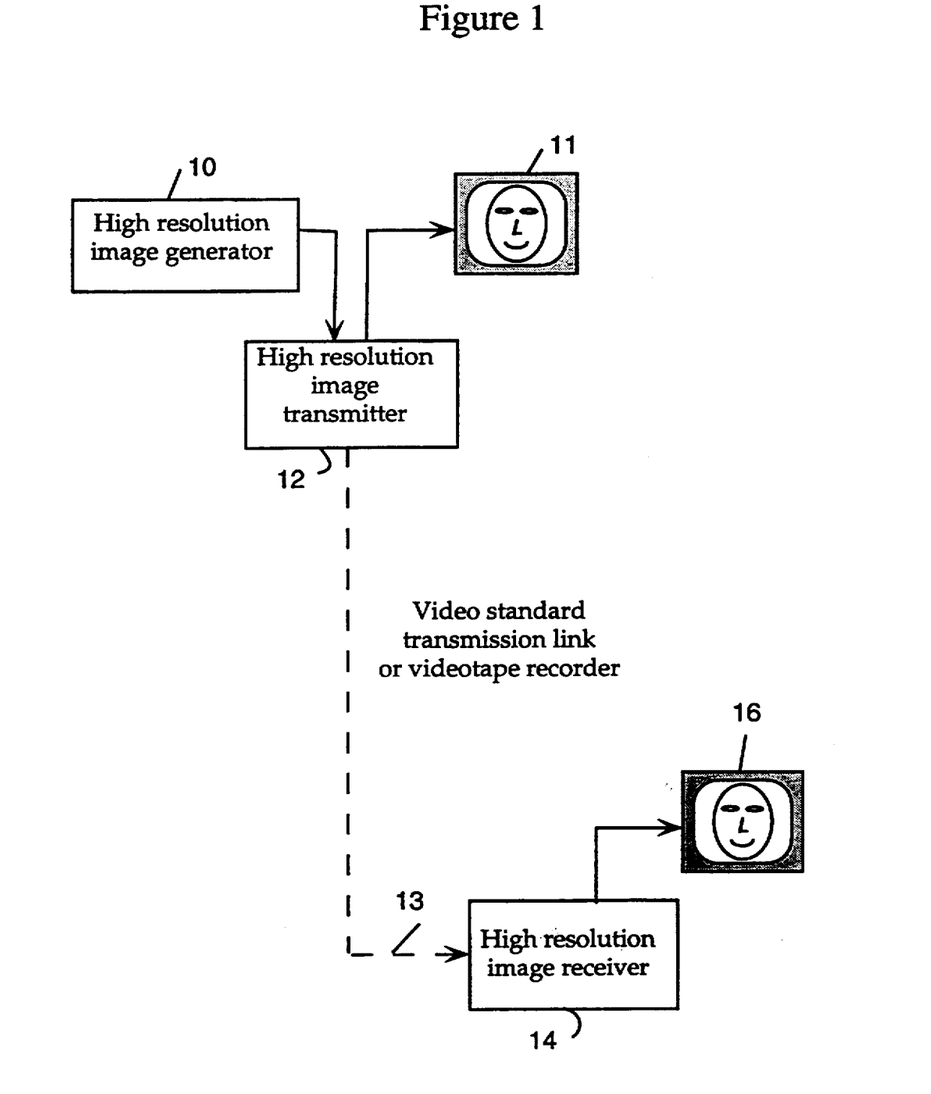
FIG. 1 illustrates an overview of the system of the invention.

The equipment described herein allows high resolution computer images to be recorded or transmitted on regular video equipment, with minimal loss of resolution. Referring to FIG. 1, high resolution image generator 10 is directed to high resolution image transmitter 12 for segmentation and conversion to a standard television signal. The high resolution image is also "looped through" to high resolution display 15 for monitoring purposes. This signal can be stored and/or transmitted over link 13 to high resolution image receiver 14 for reconstruction and display as high resolution image 16.

A typical computer workstation screen has a resolution of 1280 pixels horizontally by 1024 pixels vertically. To manipulate, store and transmit images of this resolution requires special, expensive equipment. NTSC and PAL equipment is readily available at moderate cost. Unfortunately, the NTSC and PAL television video standards do not support this higher resolution. It is possible to scan convert the high resolution image to a standard resolution television signal but this requires giving up more than 75% of the spatial resolution.

Figure 2:
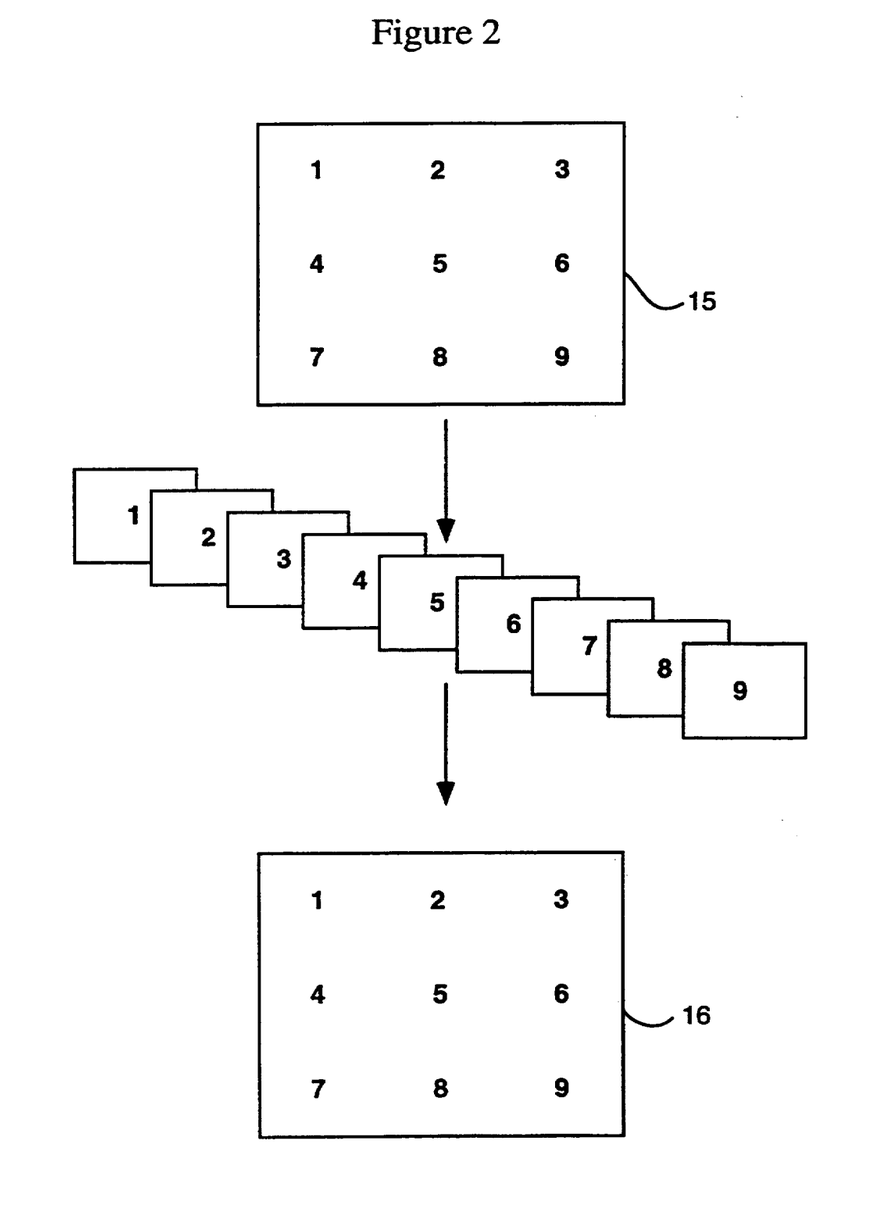
FIG. 2 illustrates decomposing a high resolution image into smaller segments, each of which can be sequentially transmitted or stored at standard television resolution, then later reconstructed to give the original high resolution image.

Another alternative is to maintain spatial resolution but forego some temporal resolution by dividing the high resolution computer image into a number of rectangular segments, each one of which contains no more detail than can be incorporated into a television format image. Referring to FIG. 2, individual image segments of high resolution image 15 are encoded into standard television format frames 1–9 and stored or transmitted sequentially. Information about the relative position of each segment can be encoded with each NTSC frame. In a preferred embodiment, the information is encoded with the corresponding frame. In this way, a high resolution image that is divided into (say) nine segments will take nine television frame times (about 300 ms for NTSC) to transmit. The original image can be reconstructed by retrieving this encoded position information to give duplicate high resolution image 16.

Using the new technique allows transmitting a 1280×1024 computer image over a standard NTSC link without losing significant detail in the source image. Each NTSC frame can support a resolution of approximately 440 pixels horizontally by 486 pixels vertically. If the 1280×1024 source image is divided into a three by three array of equally sized rectangles, each rectangle has a resolution of approximately 427 pixels horizontally, by 341 pixels vertically, which may be adequately represented by an NTSC frame. This technique, however, gives a relatively low image update rate. In the example given a typical frame rate for the computer might be 72 frames per second, but after transmission the frame rate is slightly over three frames per second (1/300 ms).

The choice of the number of segments is a compromise. If the source image is divided into four segments, some fine detail in the source image is lost but the effective transmission frame rate is increased to 7.5 frames per second, giving much better motion portrayal. On the other hand, if fine color detail is important but motion portrayal is relatively unimportant, sixteen or more segments would be a good choice. This is because, for fine color detail, NTSC has less horizontal resolution than the 440 pixels mentioned above.

Because information on segment size and segment location is encoded in every NTSC frame, it is possible to vary the number of segments in a manner appropriate to the source material. The receiving apparatus can decode which segment scheme has been used, and correctly reconstitute the image.

Transmitter—Overview

It is possible to achieve this high resolution image transmission scheme with varying degrees of sophistication. For example, one scheme involves a high resolution digitizer which digitizes only those pixels of interest for the currently required image segment.

Figure 3:
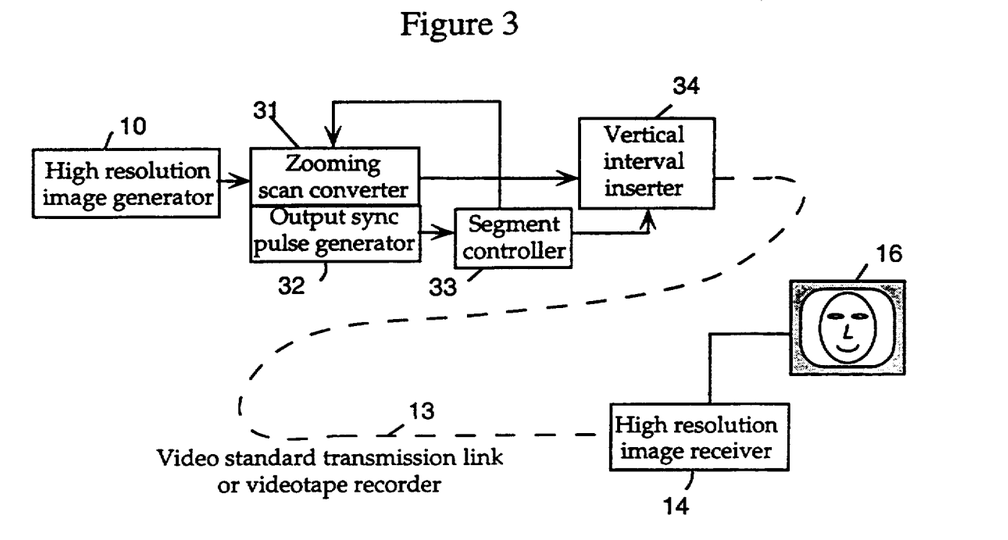
FIG. 3 is a block diagram of the components of the encoder/transmitter of the invention.

The method of this invention is a more sophisticated one incorporating a zooming scan converter. Referring to FIG. 3, input from a high resolution image source, e.g. from high resolution image generator 10, is passed to zooming scan converter 31 and ultimately output as an NTSC image representing a selected rectangular region of the workstation image. The operation of the zooming scan converter is controlled by segment controller 33 which, synchronized to output sync pulse generator 32, instructs zooming scan converter 31 to select and convert the appropriate segment of the input image to an NTSC output image. The instructions from segment controller 33 are changed with every NTSC frame so the NTSC output frames cycle through the appropriate input image segments. Segment controller 33 also controls vertical interval inserter 34 which encodes appropriate segment identification and other desired information in the vertical blanking region of each NTSC frame.

Zooming Scan Converter

Figure 4:
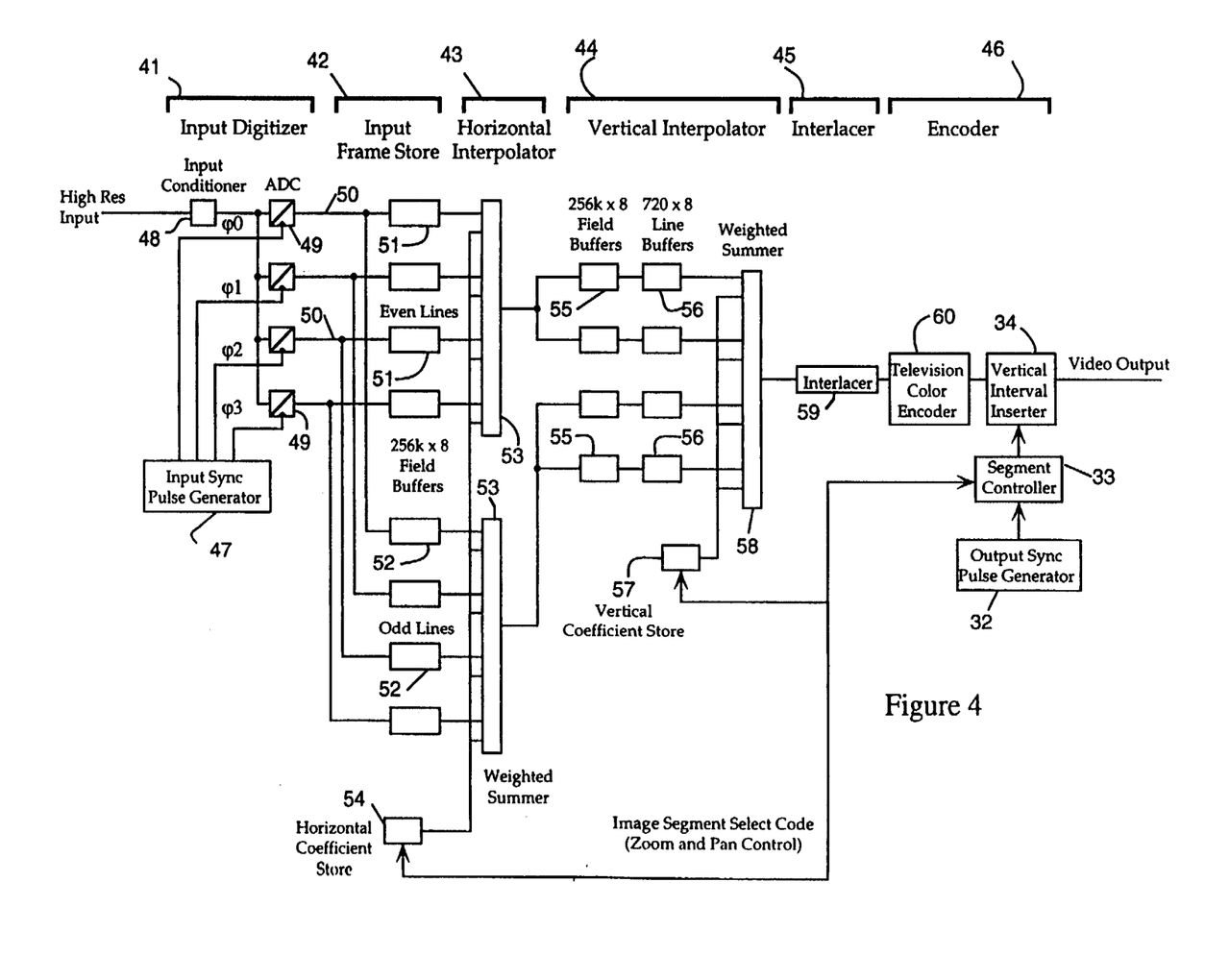
FIG. 4 is a detailed block diagram of the encoder/transmitter of the invention.

Referring to FIG. 4, zooming scan converter 31 has several portions: input digitizer 41, input frame store 42, horizontal interpolator 43, vertical interpolator 44, interlacer 45 and encoder 46.

Input digitization

Input sync pulse generator 47 synchronizes to the incoming computer signals, and generates the sampling clocks and a number of control pulses for the input digitizer. Each of the green, blue and red input channels is digitized by four analog-to-digital converters (ADCs) 49. The processing of each of the green, blue an red inputs is identical. A representative input is illustrated in FIG. 4 but two similar inputs for the remaining two colors will be used in a typical application.

A typical input for digitizing has resolution up to 1280×1024 and frame rates of up to 74 frames per second. This corresponds to pixel rates up to 135 MHz. Unfortunately, ADCs which operate at this sample rate are relatively expensive. In a preferred embodiment, the input circuitry uses four slower ADCs 49 with appropriately phased clocks at quarter sampling frequency (i.e. up to 33.75 MHz). The ADC 49 with the earliest clock samples pixels 0, 4, 8, 12, . . . (where pixel 0 is the extreme left hand pixel on any given line); the next ADC 49 samples pixels 1, 5, 9, 13, . . . and so on. While it is straightforward to use a sampling rate identical to that with which the high resolution input image was generated, it may sometimes be advantageous to use a higher or lower sampling rate.

Input Frame Store

The four parallel pixel streams are fed over lines 50 to the input frame store 42 circuitry. Each ADC 49 writes a stream of pixels into one of two FIFO-type frame buffers. Pixels from odd lines are written into a corresponding odd line buffer 52, and pixels from even lines are written into a corresponding even line buffer 51. This scheme applies regardless of whether the input signal is interlaced or non-interlaced. To achieve this, the frame buffer write alternates between even and odd buffers 51 and 52 on a line-by-line basis for non-interlaced input signals, and on a field-by-field basis for interlaced input signals.

The input frame store is written at source frame rate, but has its contents read out synchronized to the output field rate.

Horizontal Interpolator

The output of each even field store 51 is fed into a horizontal interpolator 53 which processes the pixel stream representing an input line to generate a pixel stream representing an output line. Correspondingly, the output of each odd field store 52 is fed into an independent but equivalent horizontal interpolator 53.

Each output pixel is generated as a weighted sum of four adjacent input pixels. For NTSC or PAL, it is convenient to output 720 pixels in an output line. The number of pixels from the input line which contribute to the output line depends on the size of the input image segment chosen to become the output, that is, the horizontal input segment can be scaled up or down by a significant factor to give the desired output line. The horizontal scaling factor affects which input pixels will contribute to a particular output pixel.

Figure 5:
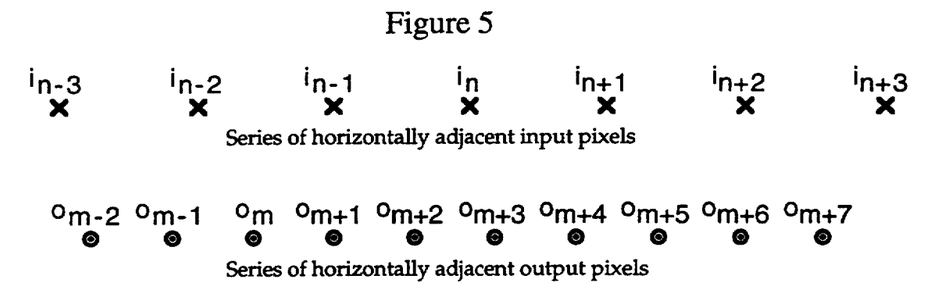
FIG. 5 illustrates two series of pixels with two different horizontal pixel spacings, showing the relationship between input pixel position and output pixel position.

For the example of a 1280×1024 input image transmitted as a three by three matrix of segments, approximately 427 adjacent pixels (plus a few spares) from each input line are used to generate each output line. FIG. 5 illustrates the horizontal position of a horizontally adjacent series of output pixels o juxtaposed with the series of corresponding input pixels i from which they were generated. Each output pixel o is a weighted sum of the two input pixels i to the left and the two input pixels i to the right of output pixel o. The weights chosen depend on the position of the output pixel o relative to the two central input pixels i of the group of four. Table 1 shows how 7 horizontally adjacent output pixels ($O_m$ through $O_{m+6}$) are constructed from input pixels. The table cells give the weights to be applied to the input pixels. For example:

$$O_{m+3} = -0.103\ i_{n-1} + 0.936\ i_n + 0.187\ i_{n+1} - 0.021\ i_{n+2}$$

TABLE 1

| | n−3 | n−2 | n1 | n | n+1 | n+2 | n+3 |
|---|---|---|---|---|---|---|---|
| m | | −0.12 | 0.724 | 0.475 | −0.079 | | |
| m+1 | | 0 | 0 | 1 | 0 | | |
| m+2 | | | −0.079 | 0.475 | 0.724 | −0.12 | |
| m+3 | | | | −0.103 | 0.936 | 0.187 | −0.021 |
| m+4 | | | | −0.028 | 0.225 | 0.914 | −0.112 |
| m+5 | | | | | −0.123 | 0.761 | 0.432 | −0.07 |

TABLE 1-continued

| n − 3 | n − 2 | n1 | n | n + 1 | n + 2 | n + 3 |
|---|---|---|---|---|---|---|
| m + 6 | | | | −0.001 | 0.026 | 0.998 −0.023 |

Referring to Table 1 and FIG. 5, calculation of the next output pixel may involve contributions of a new input pixel (compare $O_{m+2}$ and $O_{+3}$) or may use the same four input pixels used to calculate the previous output pixel (compare $O_{m+3}$ and $O_{m+4}$).

Referring again to FIG. 4, the appropriate weighting factors of the four input pixels, and the decision on whether a new pixel fetch is required are administered by horizontal coefficient store 54. The horizontal coefficient store 54 is loaded by the microcomputer (under control of the segment controller 33) according to the desired segment size. For each new output pixel, the read address of the coefficient store is incremented by one. The output of the coefficient store contains the coefficients to be applied to the four input pixels, and a cede which determines which, if any, of the input pixels needs to be updated with a new pixel.

Appropriate coefficients can be selected in many ways known to those skilled in the art. One method is to use the interpolation function shown here. This package is used to calculate the coefficients for an interpolator such as would be used in the zooming scan converter. The following example is written in the Mathematica language but one skilled in the art can prepare a similar routine in a variety of computer languages.

```
Begin Package["Interpolator'"]
Clear[InterpCoeffts]
Clear[PlotInterpTime]
Clear[PlotInterpFreq]
InterpCoeffts::usage = "InterpCoeffts[ntaps, nphases]
generates a table of interpolator coefficients for an even
interpolator of ntaps and a number of phases equal to nphases."
PlotInterpTime::usage = "PlotInterpTime[ntaps]
generates a plot of the unsampled impulse response for an even
interpolator of length ntaps."
PlotInterpFreq::usage = "PlotInterpFreq[ntaps]
generates a plot of the frequency response for an even
interpolator of length ntaps."
Begin["Interpolator'Private'"]
InterpCoeffts[ntaps_, nphases_] :=
  Module[{phase, i, tap},
    MatrixForm[
      Table[
        Chop[
          N[
            1/ntaps (1 + Cos[Pi (−ntaps/2 +tap +
phase/nphases)] +
            2 Sum[Cos[2 Pi i (−ntaps/2 +tap +
phase/nphases)/ntaps],
              {i, ntaps/2 − 1}])
          ]
        ],
        {phase, 0, nphases − 1}, {tap, 0, ntaps − 1}
      ]
    ]
  ]
PlotInterpTime[ntaps_] :=
  Module[{x, i},
    Plot[
      1/ntaps (1 + Cos[Pi x] +
      2 Sum[Cos[2 Pi i x/ntaps], {i, ntaps/2 − 1}]),
      {x, −ntaps/2, ntaps/2}, PlotRange −> {−.25, 1.0}
    ]
  ]
PlotInterpFreq[ntaps_] :=
  Module[{phase, i, j, x, tap},
    cffts = Table[
      N[
        1/ntaps (1 + Cos[Pi (−ntaps/2 +tap + 0.5)] +
        2 Sum[Cos[2 Pi i (−ntaps/2 +tap + 0.5)/ntaps],
          {i, ntaps/2 − 1}])
      ],
      {tap, ntaps/2, ntaps − 1}
    ];
    Plot[0.5 + cffts.Table[Cos[Pi j x], {j, 1, ntaps − 1, 2}],
      {x, 0, 1}, PlotRange −> {−.2, 1.2}
    ]
  ]
]
End[ ]
EndPackage[ ]
```

Figure 6:
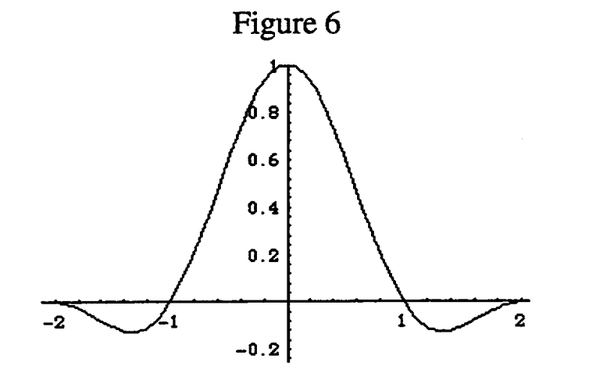
FIG. 6 illustrates a spatial impulse response of a four tap interpolation function.
Figure 7:
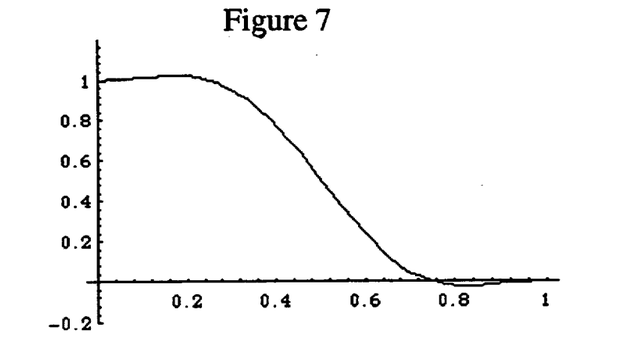
FIG. 7 illustrates a spatial frequency response for a representative four tap interpolation function.

Referring to FIG. 6, the curve gives the unsampled spatial impulse response of a representative four tap interpolation function. Referring to FIG. 7, the curve gives the spatial frequency response of the representative four tap interpolation function whose impulse response was first calculated. InterpCoeffts[4,32] yields the following table, which is stored for access by horizontal look up.

TABLE 2

| Sub-pixel Phase | Coefficients (4) | | | |
|---|---|---|---|---|
| 0 | 0. | 0. | 1. | 0. |
| 1 | −0.000601546 | 0.0257377 | 0.998194 | −0.02333 |
| 2 | −0.00239604 | 0.0538123 | 0.992789 | −0.0442049 |
| 3 | −0.00535317 | 0.0841302 | 0.983823 | −0.0626003 |
| 4 | −0.00942276 | 0.116575 | 0.971363 | −0.078515 |
| 5 | −0.0145353 | 0.15101 | 0.955496 | −0.0919704 |
| 6 | −0.0206028 | 0.187275 | 0.936338 | −0.10301 |
| 7 | −0.0275194 | 0.225192 | 0.914025 | −0.111698 |
| 8 | −0.0351631 | 0.264565 | 0.888716 | −0.118118 |
| 9 | −0.0433963 | 0.305179 | 0.860593 | −0.122376 |
| 10 | −0.0520681 | 0.346806 | 0.829853 | −0.124591 |
| 11 | −0.0610151 | 0.389202 | 0.796713 | −0.124901 |
| 12 | −0.0700639 | 0.432114 | 0.761406 | −0.123456 |
| 13 | −0.0790326 | 0.475278 | 0.724175 | −0.120421 |
| 14 | −0.0877326 | 0.518424 | 0.685278 | −0.115969 |
| 15 | −0.0959713 | 0.561275 | 0.64498 | −0.110284 |
| 16 | −0.103553 | 0.603553 | 0.603553 | −0.103553 |
| 17 | −0.110284 | 0.64498 | 0.561275 | −0.0959713 |
| 18 | −0.115969 | 0.685278 | 0.518424 | −0.0877326 |
| 19 | −0.120421 | 0.724175 | 0.475278 | −0.0790326 |
| 20 | −0.123456 | 0.761406 | 0.432114 | −0.0700639 |
| 21 | −0.124901 | 0.796713 | 0.389202 | −0.0610151 |
| 22 | −0.124591 | 0.829853 | 0.346806 | −0.0520681 |
| 23 | −0.122376 | 0.860593 | 0.305179 | −0.0433963 |
| 24 | −0.118118 | 0.888716 | 0.264565 | −0.0351631 |
| 25 | −0.111698 | 0.914025 | 0.225192 | −0.0275194 |
| 26 | −0.10301 | 0.936338 | 0.187275 | −0.0206028 |
| 27 | −0.0919704 | 0.955496 | 0.15101 | −0.0145353 |
| 28 | −0.078515 | 0.971363 | 0.116575 | −0.00942276 |
| 29 | −0.0626003 | 0.983823 | 0.0841302 | −0.00535317 |
| 30 | −0.0442049 | 0.992789 | 0.0538123 | −0.00239604 |
| 31 | −0.02333 | 0.998194 | 0.0257377 | −0.000601546 |

The table above gives the sampled spatial impulse response of the representative four tap interpolation function. The numbers are presented in floating point format, although in practice they would be converted to a signed integer format to be consistent with the hardware.

The arithmetic that calculates the position of an output pixel relative to the surrounding input pixels is not carded out to arbitrary precision. In this example, the position is quantized to one of 32 possible positions. Each of the 32 rows of the above table represents the weights of four adjacent input pixels used to generate an output pixel, for each of the possible 32 output pixel positions. This table can be precalculated for a given scaling factor, then used as a look-up table for each output pixel. For example, the input pixel weighting coefficients for output pixel $O_m$ are from entry for sub-pixel phase 19 while the coefficients for output pixel $O_{m+4}$ are from the entry for phase 7.

In this way, the even and odd horizontal interpolators 53 output a pair of output lines as a signal representing a vertical strip of the input image. This strip has been processed to NTSC width, in this case 720 pixels, but is still the full height of the input image. The vertical height can be scaled by passing the signals to the vertical interpolator 44.

Vertical Interpolator

The operation of the vertical interpolator 44 is analogous to that of the horizontal interpolator. Its purpose is to synthesize each output line as a weighted sum of input lines. To do this it needs simultaneous access to four adjacent input lines.

The output of each horizontal interpolator 53 is routed to one of two FIFO style field buffers 55. Lines 0, 2, 4, ... are processed by the even interpolator 53 and lines 1, 3, 5, ... are processed by the odd interpolator 53. The field buffer 55 which is written alternates on a line by line basis. In this way, one field buffer 55 contains lines 0, 4, 8, 12, ..., the next contains lines 1, 5, 9, 13, ..., a third contains lines 2, 6, 10, 14, ... and so on. The outputs of these four buffers provide four vertically adjacent horizontal lines as inputs for the vertical interpolator. Analogously to the horizontal interpolator, the vertical interpolator may need a new input line for some output lines but will invariably need at least one of the input lines used in generating the previous output line. The architecture of the field buffers 55 does not allow repeated accesses to the same line, so each field buffer 55 is followed by a line buffer 56 which can store a full horizontal line to allow repeated access to the line stored therein.

The appropriate weighting factors of the four input lines, and the decision on whether a new line is required are administered by the vertical coefficient store 57. The vertical coefficient store 57 is loaded by the microcomputer according to the desired segment size. For each new output line, the read address of the coefficient store is incremented by one. The output of the coefficient store contains the coefficients to be applied to the four input lines, and a code which determines which, if any, of the input lines needs to be updated with a new line. Coefficients are generated and stored in a look-up table then accessed in a manner similar to that described above for the horizontal interpolator.

In the preferred embodiment, the output of the vertical interpolator is a 720×486 (for NTSC) image representing the segment of the input image selected by the segment controller. The system supports a frame rate of 59.94 Hz and provides a non-interlaced image.

Interlacer

The interlacer 45 is a line buffer 59 whose write clock is twice the frequency of its read clock. To generate an even field, only even lines are written to the buffer then read out at half the speed. To generate an odd field, only odd lines are written to the buffer then read out at half the speed.

Color Encoder

The output of the interpolator 45, as shown in FIG. 4, is one channel of a GBR signal at NTSC scanning rates. This output, together with the outputs from the other two channel interlacers, is fed to a commercially available NTSC encoder chip set 60 that generates NTSC and S-Video outputs from the NTSC scanning standard GBR input (or, if so configured, generates PAL and S-Video outputs from the PAL scanning standard GBR input). As described above in connection with FIG. 3, this output is synchronized by output sync generator 32 and routed to vertical interval inserter 34.

Vertical Interval Inserter

Figure 8:
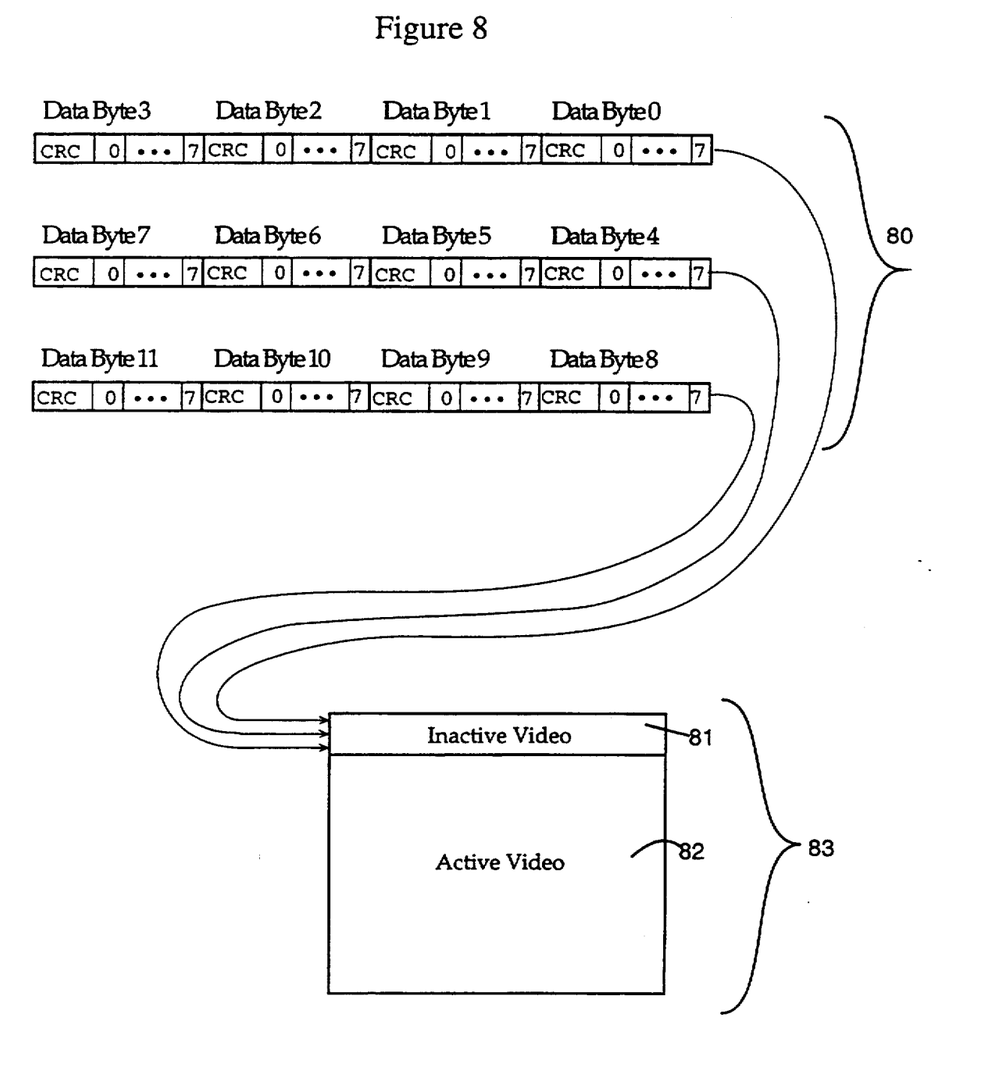
FIG. 8 illustrates encoding information in the vertical blanking interval.

Referring to FIG. 8, the vertical interval inserter inserts coded information 80 in the inactive video lines 81 of vertical blanking, before active video lines 82 as part of each complete frame 83. On each output field, a total of 96 bits of information may be inserted for later extraction by the receiving equipment. Under control of the segment controller, the vertical interval inserter inserts data on segment size and position. There is adequate data space available to insert additional information, such as date, time and arbitrary user data.

Receiver—Overview

In the receiving apparatus the reciprocal operations take place (not shown, see FIG. 1 generally). A vertical interval decoder detects the vertical control codes and sends the information to a segment distributor. The segment distributor resizes the incoming NTSC image (if necessary) and writes each frame (representing a segment of the original workstation image) into the appropriate region of a high resolution frame buffer. Finally, the frame buffer contents are read out as a high resolution image, converted to analog form and displayed on a high resolution monitor.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A video image system comprising:
   means for dividing a high resolution video image into a selectable plurality of segments,
   means for converting each said segment to a standard television frame, and
   means for encoding information about the relative position of each said segment in the high resolution video image,
   wherein said means for dividing a high resolution video image into a selectable plurality of segments comprises a zooming scan converter.

2. The video image system of claim 1 further comprising means for selecting a number of segments comprising said selectable plurality of segments.

3. A video image system comprising:
   means for dividing a high resolution video image into a selectable plurality of segments,
   means for converting each said segment to a standard television frame, and
   means for encoding information about the relative position of each said segment in the high resolution video image, and
   a means for scaling each said segment to fit a standard television frame.

4. The video image system of claim 3 further comprising a means for interpolating adjacent pixels as part of said means for scaling.

5. The video image system of claim 3 further comprising a means for selectively scaling each said segment independently in a selected one dimension of horizontal and vertical dimensions.

6. A method of converting a high resolution video image, said method comprising:
providing a high resolution video image,
dividing said high resolution video image into a selectable plurality of segments,
converting each said segment into a standard television frame,
encoding information about the relative position of each said segment in said high resolution video image,
wherein said dividing a high resolution video image into a selectable plurality of segments comprises using a zooming scan converter.

7. The method of claim 6 wherein said selectable plurality of segments comprises a first number of segments for a first image of a high resolution video image, and further comprising providing means for providing a second image of a high resolution video image with a second number of segments where said second number of segments differs from said first number of segments.

8. A method of converting a high resolution video image, said method comprising:
providing a high resolution video image,
dividing said high resolution video image into a selectable plurality of segments,
converting each said segment into a standard television frame,
encoding information about the relative position of each said segment in said high resolution video image, and
scaling each said segment to fit a standard television frame.

9. The method of claim 8 further comprising interpolating adjacent pixels as part of said scaling.

10. The method of claim 8 further comprising selectively scaling each said segment independently in a selected one dimension of horizontal and vertical dimensions.

* * * * *